United States Patent
Mathie et al.

(10) Patent No.: US 10,454,120 B2
(45) Date of Patent: Oct. 22, 2019

(54) FUEL CELL MULTIFUNCTION CATHODE VALVE

(71) Applicant: Ford Global Technologies, LLC, Dearborn, MI (US)

(72) Inventors: Craig Michael Mathie, White Lake Township, MI (US); Martin Pryor, Canton, MI (US); Matthew Riley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 15/145,321

(22) Filed: May 3, 2016

(65) Prior Publication Data
US 2017/0324100 A1 Nov. 9, 2017

(51) Int. Cl.
*H01M 8/04089* (2016.01)
*H01M 8/04302* (2016.01)
*H01M 8/04111* (2016.01)
*H01M 8/0432* (2016.01)
*H01M 8/0438* (2016.01)
*H01M 8/043* (2016.01)
*H01M 8/04858* (2016.01)
(Continued)

(52) U.S. Cl.
CPC ....... *H01M 8/04302* (2016.02); *H01M 8/043* (2016.02); *H01M 8/04111* (2013.01); *H01M 8/04335* (2013.01); *H01M 8/04395* (2013.01); *H01M 8/04753* (2013.01); *H01M 8/04873* (2013.01); *H01M 2008/1095* (2013.01); *H01M 2250/20* (2013.01); *Y02T 90/32* (2013.01)

(58) Field of Classification Search
CPC ......... H01M 8/04126; H01M 8/04298; H01M 8/04097; H01M 8/04302; H01M 8/04873; H01M 8/04753; H01M 8/04335; H01M 8/04395; H01M 8/043; H01M 8/04111; H01M 2008/1095; H01M 2250/20; Y02T 90/32
See application file for complete search history.

(56) References Cited

U.S. PATENT DOCUMENTS 8,642,200 B2 2/2014 Kirklin
8,846,262 B2 9/2014 Mussro et al.
(Continued)

FOREIGN PATENT DOCUMENTS

WO WO-2015079066 A1 * 6/2015 ........ H01M 8/04097

*Primary Examiner* — Milton I Cano
*Assistant Examiner* — Philip A. Stuckey
(74) *Attorney, Agent, or Firm* — David Kelley; Brooks Kushman P.C.

(57) ABSTRACT

A fuel cell system in a vehicle has a cathode and an anode. A compressor has an inlet and an outlet, the outlet being configured to outlet a compressed air from the compressor. A bypass line is configured to return the compressed air from the outlet to the inlet such that the air returns to the compressor in a loop. A valve is located downstream of the compressor and is operable in a plurality of modes. In a first mode, the valve is configured to block the air from the cathode and return the air via the bypass line. In a second mode, the valve is configured to direct at least some of the air to the cathode. The valve can also be configured to operate in a third mode in which the air is sent to the cathode without going through the bypass line.

10 Claims, 5 Drawing Sheets

(51) Int. Cl.
*H01M 8/04746* (2016.01)
*H01M 8/1018* (2016.01)

(56) References Cited

U.S. PATENT DOCUMENTS

| | | |
|---|---|---|
| 9,029,036 B2 | 5/2015 | Zhang et al. |
| 2004/0161647 A1 | 8/2004 | Rainville et al. |
| 2008/0152968 A1* | 6/2008 | Zhou ................. H01M 8/04097 429/442 |
| 2011/0097636 A1* | 4/2011 | Kurrle ............... H01M 8/04097 429/429 |
| 2015/0188161 A1 | 7/2015 | Kwon et al. |
| 2017/0054162 A1* | 2/2017 | Rouveyre ......... H01M 8/04097 |

* cited by examiner

FUEL CELL MULTIFUNCTION CATHODE VALVE

TECHNICAL FIELD

The present disclosure relates to a valve in a cathode loop of a fuel cell system of a vehicle.

BACKGROUND

Fuel cells, such as hydrogen fuel cells, are one possible alternative energy source for powering vehicles. In general, fuel cells include a negative electrode (anode), an electrolyte, and a positive electrode (cathode). In a proton exchange membrane fuel cell (PEMFC), the electrolyte is a solid, proton-conducting membrane that is electrically insulating but allows protons to pass through. Typically, the fuel source, such as hydrogen, is introduced at the anode using a bipolar or flow field plate where it reacts with a catalyst and splits into electrons and protons. The protons travel through the electrolyte to the cathode and the electrons pass through an external circuit and then to the cathode. At the cathode, oxygen in air introduced from another bipolar plate reacts with the electrons and the protons at another catalyst to form water.

SUMMARY

According to an embodiment, a fuel cell includes a cathode, an anode, and a compressor having an inlet and an outlet, wherein the outlet is configured to outlet a compressed air from the compressor. The fuel cell also includes a bypass line configured to return the air from the outlet to the inlet, and a valve operable in (i) a first mode configured to block the air from the cathode, and (ii) a second mode configured to direct at least some of the air to the bypass line.

In another embodiment, a method of selectively delivering air from a compressor to a fuel cell cathode includes operating a valve in a first position such that compressed air from the compressor returns to the compressor and is prevented from flowing toward a humidifier. The method also includes operating the valve in a second position such that part of the compressed air returns to the compressor and part of the compressed air flows toward the humidifier.

In yet another embodiment, a fuel cell compressor recirculation system includes an air compressor having an inlet and an outlet. The system also includes a valve, a first fluid line fluidly coupling the outlet to the valve, a second fluid line fluidly coupling the valve to the inlet, and a third fluid line fluidly coupling the valve to a fuel cell cathode. The valve is configured to selectively divert air into the second line while blocking the air from flowing into the third line.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
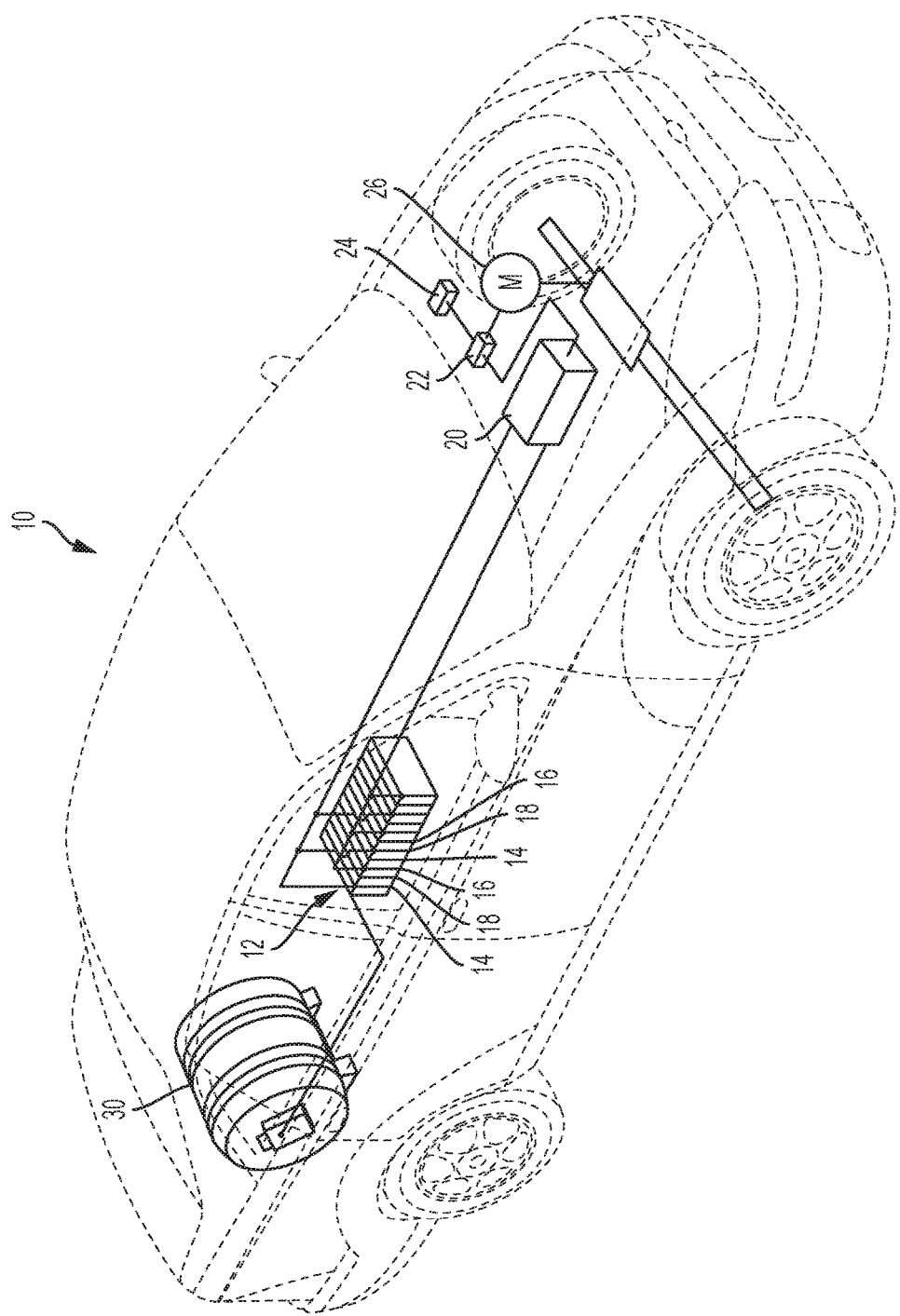
FIG. 1 is a schematic illustration of a fuel cell system in a vehicle, according to an embodiment.

Referring to FIG. 1, a vehicle 10 is illustrated with a fuel cell 12 for powering the vehicle 10. The vehicle 10 of FIG. 1 is a car, however it should be understood that the vehicle 10 can also be other vehicles such as a truck, an off-road vehicle, or an urban vehicle. As will be further described below, the fuel cell 12 may include an anode 14, a cathode 16, and a membrane 18 therebetween. In this fashion, the fuel cell 12 may be a proton exchange membrane fuel cell (PEMFC) 12.

The fuel cell 12 electrically communicates with and provides energy to a high voltage bus 20. The high voltage bus 20 electrically communicates with and provides energy to a DC-to-DC converter 22. The DC-to-DC converter 22 electrically communicates with both a battery 24 and a traction motor 26. The traction motor 26 is connected to one or more wheels to propel the vehicle.

While the fuel cell 12 is illustrated as supplying power for the traction motor 26, it should be understood that the fuel cell 12 may additionally or separately be used to power other parts of the vehicle 10 (e.g., accessories) without departing from the scope of the present disclosure.

A primary fuel source 30 is connected to the fuel cell 12. In one embodiment, the primary fuel source 30 is a storage tank of high-pressure hydrogen or a storage device of hydride. The primary fuel source 30 supplies the fuel cell 12 with the primary fuel (e.g., high-pressure hydrogen or hydride) to react with oxygen in the air (supplied by a compressor in one embodiment) to power the vehicle, according to one embodiment.

Figure 2:
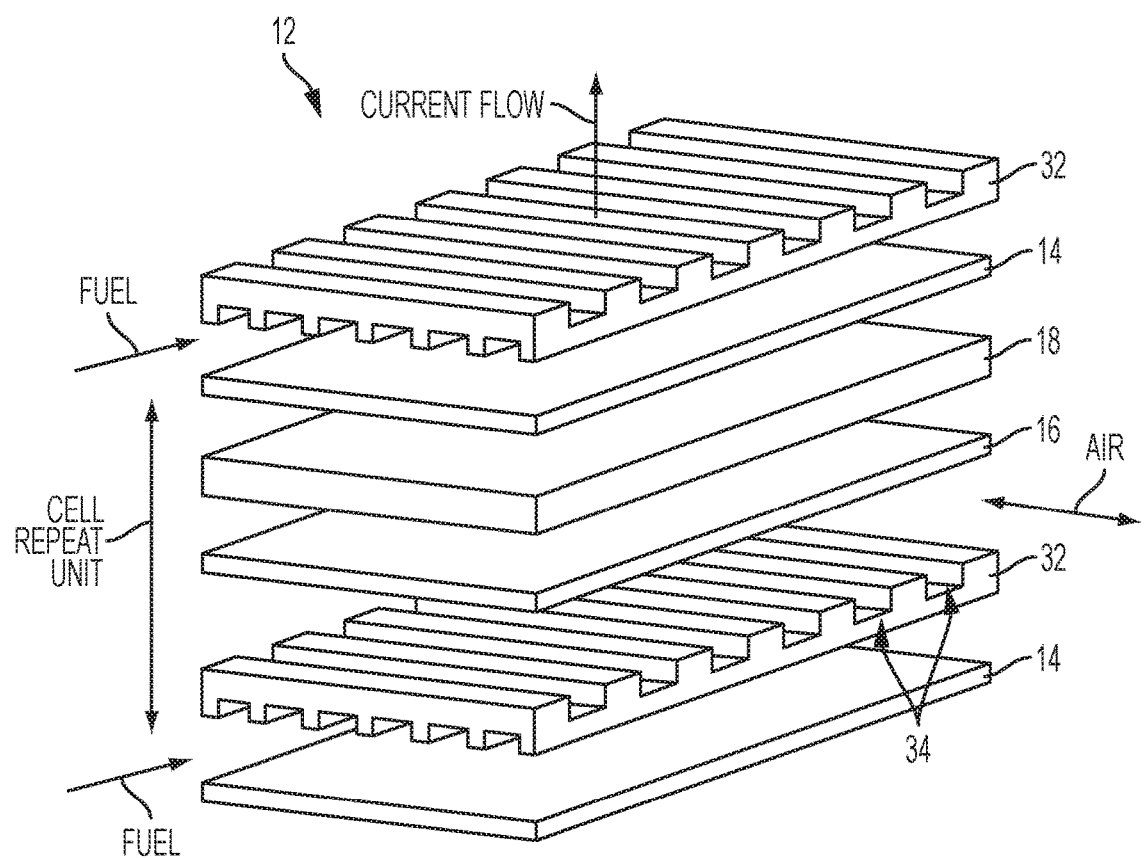
FIG. 2 is an exploded perspective view of a portion of a proton exchange membrane fuel cell (PEMFC), according to an embodiment.

FIG. 2 illustrates an example of a portion of a proton exchange membrane fuel cell (PEMFC) 12, such as the fuel cell 12 of FIG. 1. The PEMFC 12 generally includes a negative electrode (anode) 14 and a positive electrode (cathode) 16, separated by a proton exchange membrane (PEM) 18 (also a polymer electrolyte membrane). The anode 14 and the cathode 16 may each include a gas diffusion layer (GDL), a catalyst layer, and a bipolar or flow field plate 32 which forms a plurality of gas channels 34. The anode catalyst layer may facilitate the splitting of hydrogen atoms into hydrogen ions and electrons while the cathode catalyst layer facilitates the reaction of oxygen gas, hydrogen ions, and electrons to form water. In addition, the anode 14 and cathode 16 may each include a microporous layer (MPL) disposed between the GDL and the catalyst layer.

The channels 34 of the bipolar plates 32 may be configured to carry gases. The channels 34 may carry air or fuel (e.g., hydrogen). As shown in FIG. 2, the plates 32 and channels 34 may be rotated 90 degrees relative to each other. Alternatively, the plates 32 and channels 34 may be oriented in the same direction. The materials of the plates 32 is such that it is electrically conductive and corrosion resistant under proton exchange membrane fuel cell (PEMFC) operating conditions to ensure that the bipolar plate perform its functions—feeding reactant gases to the membrane electrode assembly (MEA) and collecting current from the MEA.

The cathode side of the fuel cell stack may be supplied with air via a compressor. Typical fuel cell systems employ valves to accomplish various functions upstream of the cathode inlet. For example, a valve can be utilized to block the cathode and to seal the cathode side of the fuel cell stack from incoming fresh air at times of stack inoperability. Such a function improves stack lifetime by enhancing hydrogen protection time in the stack. Another valve can be utilized to operate a system bypass function to permit some of the air compressor outlet flow to bypass the fuel cell stack and exit directly to the exhaust. This is done to increase the flow of air through the compressor while maintaining the same compressor pressure ratio (the ratio of the air pressure at the inlet of the compressor to the air pressure at the outlet of the compressor). This function is desirable to avoid compressor surge events by moving the compressor operating point to a stable region of the compressor map. The cathode-blocking function and system-bypass function are typically performed at two various locations, and thus require the use of multiple valves.

Accordingly, the present disclosure provides a single valve configured to accomplish both the cathode-blocking function and the system-bypass function at a single location.

Figure 3A:
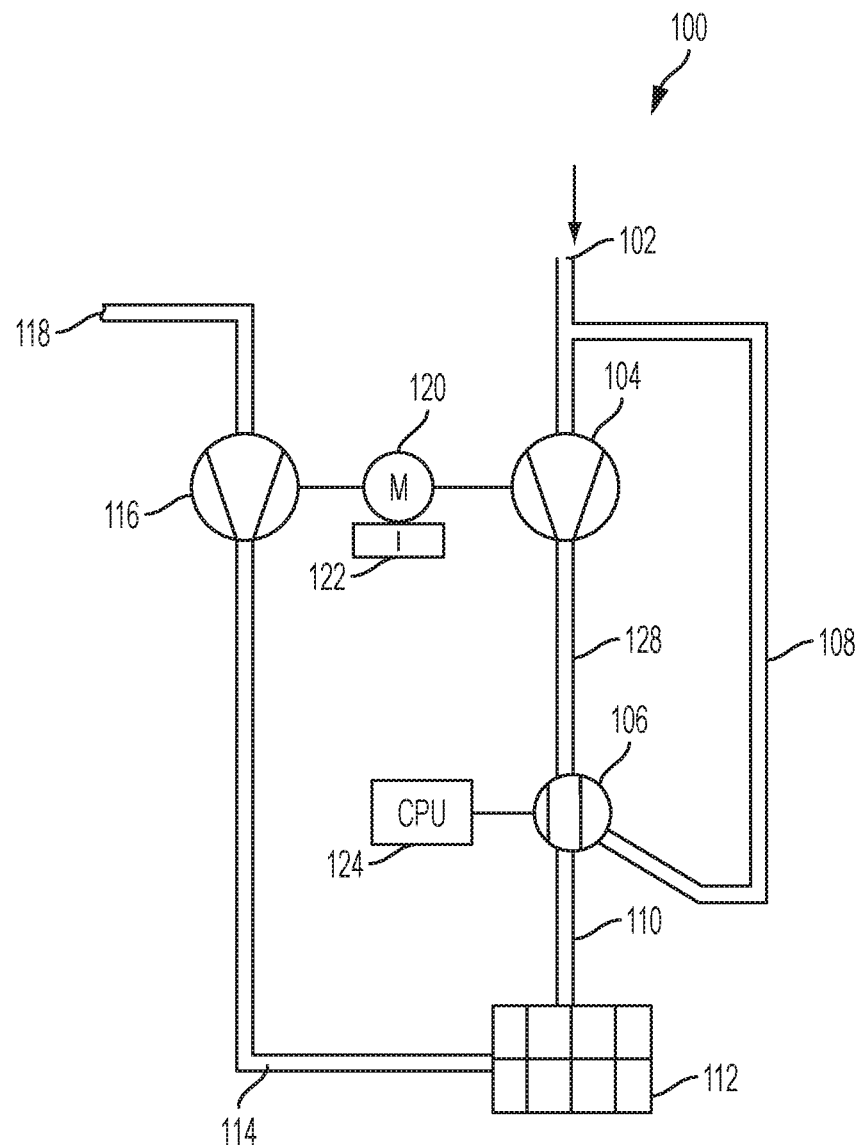
FIG. 3A is a schematic illustration of a cathode loop in a fuel cell system for supplying air to a cathode side of a fuel cell stack, according to an embodiment. In this figure, a valve is positioned to allow compressed air to flow toward the cathode side.
Figure 3B:
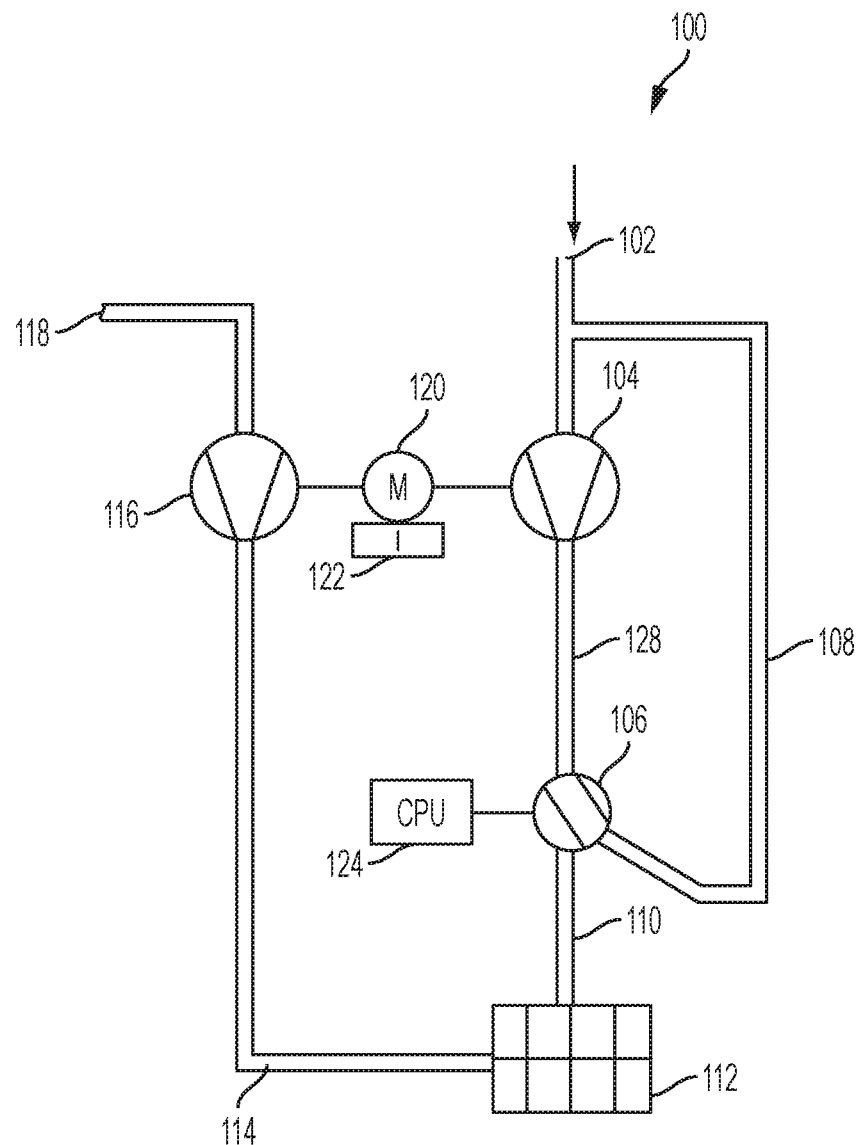
FIG. 3B is a schematic illustration of the cathode loop of FIG. 3A, with the valve positioned to block the air from flowing to the cathode side and instead directing the air to return to the compressor inlet, according to an embodiment.
Figure 3C:
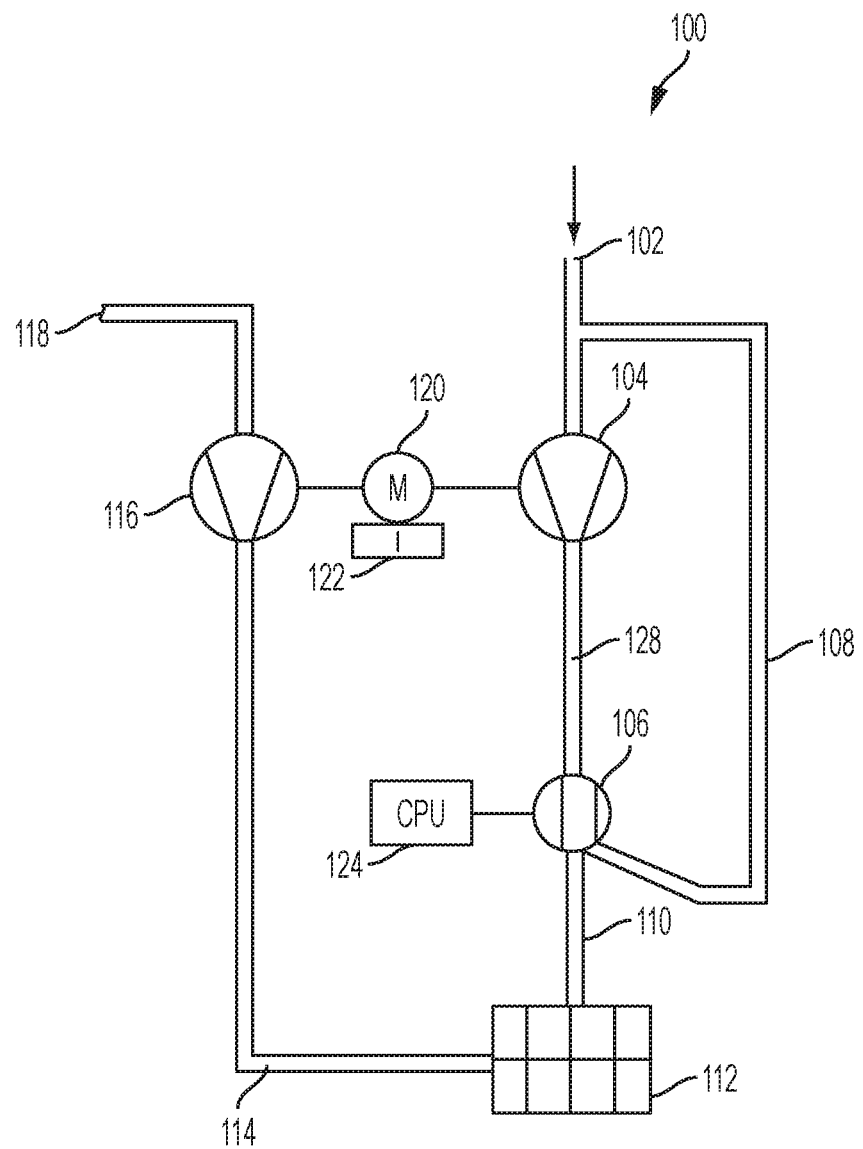
FIG. 3C is a schematic illustration of the cathode loop of FIGS. 3A and 3B, with the valve positioned to allow some of the air to flow toward the cathode side while also returning some of the air, according to an embodiment.

Referring to FIGS. 3A-3C, a system 100 for supplying air to the cathode side of the fuel stack is illustrated according to one embodiment. The fluid lines from an inlet 102 to the cathode can be referred to as the cathode loop. Ambient air enters the inlet 102 and is compressed via a compressor 104. The compressed air is sent to a single, multifunction valve 106 that can be configured to act as both a bypass valve and a cathode-blocking valve, as will be described below.

The valve 106 can be controlled to return the air via a bypass line 108 (or return line), to block the air, or to send the air through a humidifier line 110 to a humidifier 112. The humidifier 112 can regulate the concentration of water vapor in the supplied gaseous oxygen within the supply lines. The humidified air is then sent through line 114 the cathode side of the fuel cell stack, and to another compressor 116 operating as an expander. The air is then sent to an outlet 118.

A motor (M) 120 coupled to an inverter (I) 122 controls operation of both compressor/expanders 104, 116.

In one embodiment, a controller 124 is specifically programmed to control the position and operation of the valve 106. The controller 124 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The controller communicates with various temperature and/or pressure sensors and an actuator on the valve 106 via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

Alternatively, the valve 106 can be a pressure-responsive or temperature-responsive valve 106 that automatically (without the use of computers) alters its position based on the air pressure and/or temperature.

As shown in FIGS. 3A-3C, the valve 106 can be a flow-through valve that connects one side of the valve to another side of the valve via an inner passageway. In that embodiment, the valve 106 can turn to align the inlet 128 of the valve with either or both of the return line 108 and humidifier line 110.

Via commands from the controller 124 or through automatic configuration, as described above, the valve 106 can be oriented in three positions, thereby operating in three distinct modes. More or less than the three modes described herein are contemplated, and the three modes and positions of the valve 106 described herein are for illustrative purposes.

FIG. 3A shows the valve 106 in a first position and operating in a first mode. In the first mode of operation, the valve 106 is fully open to connect the line 128 to line 110, thus allowing the compressed air to enter the humidifier 112 while blocking the bypass line 108. This mode of operation can take place during normal operation of the fuel cell stack, allowing oxygen in the air to travel to the cathode side of the fuel stack.

FIG. 3B shows the valve 106 in a second position and operating in a second mode. In the second mode of operation, the valve 106 connects line 128 to bypass line 108, thus bypassing the air back to the compressor 104. This also blocks the air from traveling to line 110 and ultimately into the cathode side of the fuel cell stack. Thus, the valve 106 operating in the second mode of operation can provide cathode-blocking functionality. This mode of operation can be commanded to occur when the fuel cell stack is not operating. For example, in response to the vehicle turning off or after some subsequent time delay, the valve 106 can be put into the second mode of operation to prevent air from entering the fuel cell stack. It may be beneficial to move the recirculation valve back to a fully open position (i.e., the first mode of operation) just prior to freezing conditions, or perform an ice breaker routine at a prescribed temperature prior to freezing if necessary.

FIG. 3C shows the valve 106 in a third position (between the first and second positions) and operating in a third mode. In the third mode of operation, the valve 106 connects line 128 to both the bypass line 108 and line 110, thus allowing partial bypass recirculation while still allowing air to enter the cathode side of the fuel cell stack.

The system bypass functionality can be accomplished by opening the valve 106 at varying positions between the first and second positions to divert varying amounts of air back to the compressor 104. In other words, the controller 124 can control the amount of air that is sent to the bypass line 108 and thus the amount of air that is sent to the cathode side of the fuel cell stack. The controller 124 can be programmed to alter the valve in the various positions depending on pre-programmed conditions. For example, the controller 124 can divert more of the compressor outlet flow away from the fuel cell stack and back to the compressor when surge conditions are likely. This mode of operation can also be useful in a cold start situation and to prevent surge.

The multifunction valve described above provides several benefits. For instance, high cell voltages can be minimized by this invention since air compressor flow can be completely diverted to the compressor inlet faster than the compressor can spool down, while at the same time preventing compressor surge. This technique can be employed during various operating modes such as startup, shutdown, low power modes, and stop mode or whenever it desirable to quickly turn off the flow of air to the cathode.

Hydrogen protection after shutdown can be partially limited due to oxygen ingress from ambient surroundings, unless a dedicated blocking valve is installed. In contrast, the valve and control system of the present disclosure can be installed such that it blocks the supply line to the cathodes of the fuel cell system and significantly limits a main flow path of oxygen ingress during shutdown. Use of the present disclosure to perform the cathode blocking function has the benefit of improving hydrogen protection while eliminating a dedicated blocking valve, resulting in system simplification and cost and complexity reduction.

In some instances when air flow cannot be reduced (or cannot be reduced fast enough), potentially damaging high cell voltages can be reduced by increasing the power drawn from the fuel cells. This consumes fuel. If the extra power is not needed, it is dissipated without useful work, which decreases fuel economy. Reduced fuel economy from dissipating power can be minimized using the valve system of the present disclosure because the supply of oxygen from the flow of air from the compressor can be diverted to the compressor inlet faster than the air flow can be stopped by turning off the compressor due to the compressor's spool down time. The diversion of air rather than the blocking of air also reduces or eliminates damage to the compressor from surge. The use of the diverting valve to reduce or stop the oxygen from reaching the cell cathodes and thus minimizing high cell voltages can be used as needed during various operating modes such as startup, shutdown, and low power and stop modes. The controller can be programmed to recognize a vehicle startup, shutdown, low power mode, and/or stop mode, and can control the valve accordingly in response to recognizing such a mode.

Use of the valve to provide compressor recirculation can also add heat energy to the air stream entering the humidifier, enabling the vaporization of more water to be used for humidifying the air stream.

The ability to use a single valve to accomplish multiple functions for the cathode side of the fuel cell reduces costs associated with multiple valves, along with a reduction in weight, reduced package space requirements, and reduced system complexity. Additionally, the valve of the present disclosure can eliminate potential hazards of a failed blocking valve. If a conventional blocking valve fails in a closed position, the result could be a broken compressor since compressor airflow would be blocked. A conventional blocking valve that fails in an open position can be difficult to detect unless there is a position sensor on the valve itself (hydrogen protection time would also be affected in this case, but is difficult to monitor). If the valve of the present disclosure fails in a closed position, compressor airflow has a path to travel via the recirculation line, so the compressor itself would not break. In addition, the valve of the present disclosure provides easier failure detection options (whether it were to fail in either an open or a closed position) through voltage or pressure analyses during system shutdown.

It should be understood that the terms "first," "second," and "third" when referring to the modes of operation or the positions of the valve are interchangeable and not meant to be limiting. For example, the disclosed "first mode of operation" illustrated in FIG. 3A can be referred to as the "third mode of operation." In other words, the terms "first," "second," and "third" are for providing context and separating out the disclosed modes and positions. For example, the use of the words "first mode" and "second mode" in the claims or summary can refer to any one of the modes disclosed above, and the terms "first" and "second" are provided to distinguish between different modes.

It should also be understood that the term "fluid line" can include one or more individually numbered fluid lines from the Figures. For example, fluid lines 110, 114, and 118 can be considered a single fluid line that fluidly couples the valve 106 to the cathode side of the fuel cell stack by providing fluid communication therebetween.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell comprising:
 a cathode and an anode; and
 a cathode loop upstream of the cathode and downstream of an ambient air inlet and having:
 a compressor having an inlet and an outlet,
 a bypass line configured to return the air from the outlet to the inlet; and
 a multifunction valve operable in:
 a first mode configured to block the air from the cathode and
 a second mode configured to direct at least some of the air to the bypass line while directing air to the cathode
 a third mode configured to block the air from being sent to the bypass line and direct the air to be sent toward the cathode.

2. The fuel cell of claim 1, further comprising a controller coupled to a pressure sensor and to the valve, wherein the controller is programmed to control the valve based on a determined air pressure within the fuel cell.

3. The fuel cell of claim 2, wherein the controller is further programmed to control the valve such that a compressor pressure ratio is maintained during operation.

4. The fuel cell of claim 1, further comprising a controller programmed to control the valve to minimize high cell voltages during one or more driving modes including start-up, shut-down, idle, and stop.

5. The fuel cell of claim 1, further comprising a controller coupled to a temperature sensor and to the valve, wherein the controller is programmed to control the valve based on a determined air temperature within the fuel cell.

6. A fuel cell system comprising:
 a cathode and an anode; and
 a fuel cell compressor recirculation system, comprising:
 an air compressor having an inlet and an outlet;
 a multifunction valve;
 a first fluid line coupling the outlet to the multifunction valve;
 a second fluid line coupling the multifunction valve to the inlet;
 and a third fluid line coupling the multifunction valve to the cathode;
 wherein the multifunction valve selectively diverts air into the second fluid line while blocking the air from flowing into the third fluid line;
 wherein the multifunction valve selectively enables some of the air into the third line while diverting some of the air into the second line; and
 wherein the multifunction valve selectively enables the air to flow from the first line to the third line while blocking air from flowing into the second line.

7. The system of claim 6, wherein the third line includes a humidifier therein.

8. The system of claim 6, further comprising a controller programmed to control the multifunction valve to minimize high cell voltages during one or more driving modes including start-up, shut-down, idle, and stop.

9. The system of claim 6, wherein the system is part of a vehicle, the system further comprising a controller coupled to the multifunction valve and programmed to, in response to the vehicle being started, control the multifunction valve to divert the air into the second line while blocking the air from flowing into the third line.

10. The system of claim 6, wherein the system is part of a vehicle, the system further comprising a controller coupled to the multifunction valve and programmed to, in response to the vehicle being shut down, control the multifunction valve to divert the air into the second line while blocking the air from flowing into the third line.

* * * * *